Patented Aug. 14, 1951

2,564,646

UNITED STATES PATENT OFFICE 2,564,646

HAZE RESISTANT VINYL CHLORIDE POLYMERS

William E. Leistner, Brooklyn, Arthur C. Hecker, Richmond Hill, and Olga H. Knoepke, Brooklyn, N. Y., assignors to Argus Chemical Laboratory, Inc., a corporation of New York No Drawing. Application February 8, 1950, Serial No. 143,142

8 Claims. (Cl. 260—45.7)

This invention relates to an improved vinyl halide resin composition and the method of making it.

The invention is particularly useful in making vinyl chloride resin compositions and will be first illustrated by description in connection with such use.

In the manufacture of plastic compositions of vinyl chloride resins, metal salt stabilizers are frequently incorporated. These are dispersed in the resin. They decrease decomposition of the vinyl resin under the influence of heat to which they are subjected during the manufacturing process. Trimmings and other scrap produced are returned to fresh batches being made. Certain parts of the stock may be thus reprocessed a number of times, with a lengthening of the exposure to heat. As a result of the processing or the reprocessing, haziness or discoloration of the stock frequently results. We consider this effect to be due to the formation of chlorides or other insoluble compounds of the metals introduced originally in the form of the dispersible and soluble stabilizers.

Our invention provides a means of retarding this development of haze or discoloration in the vinyl chloride polymer or copolymer composition even when the composition is reprocessed in the making of commercial plastics.

Briefly stated, our invention comprises the method of and the composition resulting from warming, to the temperature of fluidizing (fluxing), a mixture of vinyl halide resin, a metal salt stabilizer of conventional type for such polymers and copolymers, and also an anti-clouding agent of kind to be described which retards precipitation of metal halide from the stabilizer compound as a cloud or haze in the stock, and shaping and then cooling the mass.

With our added anti-clouding agent, we may process and reprocess the composition as desired, with either elimination of the haze or discoloration normally produced or such retardation of its development as to give a commercially satisfactory condition after even many reprocessings of the composition. In addition, our anti-clouding agent decreases such decomposition and side reactions as normally cause development of undesired color in the stock. The agent also decreases change of color on exposure to light, particularly ultra-violet light, and the development of brittleness on aging.

As to materials used, the resin is a vinyl halide resin, this term being used to include vinyl halide polymers; copolymers with vinyl acetate, vinylidine chloride, styrene, dialkyl fumarate or maleate, or other alkyl esters of mono-olefinic acids; and also vinylidine chloride polymer. The vinyl halide used is ordinarily and preferably the chloride, although others such as the bromide and fluoride may be used. As the alkyl in the esters recited, we use any alkyl, as the dibutyl, dihexyl, and di-2-ethyl hexyl esters.

The stabilizers used are those that are conventionally used as stabilizers in vinyl resin compositions. They are metal salts that are compatible with, that is, dispersible in the vinyl resin. They are, for that reason, non-blooming under ordinary circumstances. They have stabilizing effect against excessive decomposition of the resin during heating. They may contain organic components. Examples of such conventional stabilizers that are used in vinyl chloride resin compositions and that we use to advantage are the salts, particularly the soaps. Thus we may use lead salts of which examples are the silicate, stearate, oleate, ricinoleate, sulfate and dibasic lead stearate; calcium, strontium, and barium salts of fatty acids containing 2 to 18 carbon atoms, as for instance, the stearate, ricinoleate, or oleate; cadmium 2-ethyl-hexoate; and corresponding cadmium, zinc, and tin salts of the fatty acids, preferably in conjunction with the alkaline earth metal salts of the kinds stated. The stabilizers may be used alone or in admixture with each other. We prefer in fact to use mixtures such as those of barium and cadmium salts, barium and strontium salts, zinc and strontium salts, barium and zinc salts, and calcium and zinc salts, the salts being to advantage the metal soaps containing the radical of a higher fatty acid such as one of those stated above. We may also use as stabilizers such organo-metal compounds as dibutyl tin dilaurate, dibutyl tin oxide, dibutyl tin maleate, and tetraphenyl tin, the tin in these compounds being tetravalent. In place of the dibutyl group, we may use other alkyl groups such as ethyl, octyl, or dodecyl. In place of the phenyl, we may use other aryl groups such as cresyl. These organic derivatives of tin, when used alone, give discoloration but no haze in vinyl resin plastics.

As the anti-clouding agent for the stabilizer, we use organic phosphites, either alkyl or aryl, these terms as used including aralkyl and alkaryl, respectively. The phosphites may be primary, secondary, or tertiary. Examples are triphenyl, tricresyl, tridimethyl-phenyl, tributyl, trioctyl, and tridodecyl phosphites or the corresponding mono- and di-alkyl or aryl phosphites. These phosphites are soluble in the vinyl chloride resin, that is, there is no separation of phases when the phosphite and resin are fluidized together by heat or when a mixture formed hot is cooled to the ordinary temperatures. The phosphite should be substantially non-volatile, that is, non-evaporating during the processing operation.

The mechanism by which phosphite protects the metal halide from being precipitated from the resin phase is not evident from the appearance of the result. We consider that the mechanism of this protection is in part the formation of a metal complex with the added phosphite or other effect retarding the formation of insoluble metal chloride.

When results less effective than those obtained with the phosphite are acceptable, there may be used other anti-clouding agents, as, for example, the so-called hindered phenols and organic sulfides. Examples of the organic sulfides are diamyl phenol sulfide, dioctyl sulfide, and diamyl sulfide. The hindered phenols are those which contain two or more alkyl groups and are thus prevented from showing tautomerism. Examples of such hindered phenols are ditertiary-butyl-metacresol and the corresponding di-isopropyl or di-octyl substitution products of ortho-, meta-, or para-cresol. Other examples are the corresponding alkyl derivatives of phenol and xylenol.

Other conventional materials, such as any usual plasticizer, coloring substance, and inert material, may be incorporated into the vinyl resin composition in usual amounts and for the usual compounding purposes.

As to proportions, the stabilizers are used in amounts that are conventional in the compounding of vinyl resin compositions. Suitable proportions are 1 to 5 parts of the stabilizer or stabilizers, such as the metal salt or salts given above, for 100 parts of the vinyl chloride polymer.

The anti-clouding agent may be used in extremely small proportions, as within the range of 0.05 to 0.5 part for 100 parts of the vinyl chloride polymer. Larger proportions up to 5 parts are effective but unnecessary.

GENERAL METHOD

In general the method of making our plastic compositions is as follows:

Weigh the vinyl resin into a dry blender and then add to it plasticizer, stabilizer, our anti-clouding agent, colors, pigments and fillers as necessary. The whole mass is then agitated, as by tumbling, to produce a uniform blend. The material is then transferred to a Banbury mixer where it is fused or fluidized at elevated temperature. The material is then dropped and transferred to a warmup mill and from the mill to a 3 or a 4 roll calender. Here the material is sheeted out in the form of a film of desired gage.

The above is the procedure for forming a film.

In making solutions of such compositions, the material is sheeted out in strips directly from the warmup mill and then dissolved in a churn or suitable mixer after the addition of the selected solvent.

To make extruded products, the sheeted product is transferred to an extruder. Here it is formed into sheets or various shapes or pelletized for molding or subsequent extrusion procedures.

Mixing operations and other processing steps are conventional except as herein stated to the contrary.

The temperature used in making the blends of the compounds is elevated, to cause fluidizing of the mass or to maintain the mass in semifluid condition during such steps as sheeting or extrusion. The temperatures to be used vary with the particular resin used, in manner well known in the art. These temperatures usually fall within the range 180° to 450° F.

With the inclusion in the mix of our anti-clouding agent, we may operate at considerably higher temperatures and process the stock for longer periods of time than is possible without objectionable results when the anti-clouding agent is omitted. This results in an added safety factor and is a protection against clouding or discoloration of stock which is processed for a particularly long time, as in the case of scrap returned repeatedly to the mix.

The property of our agent which prevents clouding in transparent stocks serves a useful, although not so readily evident, effect in pigmented vinyl halide plastics.

Retarding the formation of the halides of the metals used in the form of stabilizers decreases the catalytic effect of these halides in the plastic. Metal chlorides are known to be accelerators of decomposition of the vinyl resins. Our process and composition are useful, therefore, not only in the clear stocks, for the reasons outlined above, but also in the pigmented, filled, and other stocks in which the development of metal halide precipitates is unobjectionable from the standpoint of appearance. In these other stocks, our invention provides a composition and method for retarding deterioration of the vinyl resin. In other words, there is a synergistic effect between our agents and the common metal stabilizers which minimizes or prevents the appearance of cloud in the transparent stocks and improves the aging properties of both transparent and pigmented or filled stocks.

This synergism is readily shown by comparison with vinyl resin stocks made in conventional manner with the so-called stabilizers alone or with our new agent alone. When the stabilizer is used without our anti-clouding agent, heating for relatively short periods of time develops haze or discoloration, the exact effect depending upon the length of time and temperature of heating and the particular one of the stabilizers selected for use. The discoloration is considered to be due to the secondary effect of the metal halide first precipitated in catalyzing further decomposition and development of color in the vinyl resin. When our anti-clouding agents are used in the resin stocks without the stabilizers, our agents either show no improvement over the resin stock alone or, in many cases, actually accelerate the decomposition. The improved serviceability of stocks made with the joint use of the stabilizers and our added agent includes improved resistance not only to heat during manufacture but also to light during subsequent exposure of the plastic.

The invention will be further illustrated by detailed description in connection with the following specific examples of the practice of it. In these examples and elsewhere herein, proportions are expressed as parts by weight for 100 parts of the resin used.

Example 1

The general procedure of the general method of making a film is followed.

100 parts of Geon 101 (vinyl chloride polymer) is weighed into a dry blender. 50 parts of plasticizer, in this case dioctyl phthalate, is added next. 2 parts of barium ricinoleate stabilizer is added along with ½ part of triphenyl phosphate as anti-clouding agent. The whole mass is agitated by tumbling for a period of one hour. It is then transferred to a Banbury mixer and fused for 10 minutes at a temperature of approximately 300° F. It is then dropped and transferred to a warmup mill whose roll temperatures are also at 300° F. The material is then fed as needed to a 3 or a 4 roll calender. The roll temperatures of the calender range from 280°–350° F. The vinyl compound is calendered into a film at .004 inch or any other desirable gage.

Example 2

The following procedure is used to advantage in making a finished solution of the resin. We use 100 parts of Vinylite VYNS (vinyl chloride and acetate copolymer). This is weighed into a dry blender. 40 parts of plasticizer, in this case, tricresyl phosphate, is added to the dry blender. 1 part of barium laurate and 1 part of cadmium laurate are next added as mixed stabilizers along with ½ part of tricresyl phosphite. The whole mass is agitated by tumbling for 30 minutes and then transferred to a 2 roll mill whose roll temperatures are at about 240° F. The mass is fluidized on the mill and then sheeted into strips which are added to a mixture consisting of 3 parts of methyl ethyl ketone and 1 part of toluol in a conventional mixer. The compound is agitated at room temperature in the mixer until complete solution results. The proportion of solvent used will vary with the concentration of solution desired as, for instance, from 500 to 3,000 parts of solvent to 100 parts of the vinyl chloride resin used.

Example 3

In making an extruded product the following is a preferred procedure. We use 100 parts of Geon 101 weighed into the dry blender along with 40 parts of dioctyl sebacate plasticizer, 2 parts of barium stearate stabilizer, and 1 part of cadmium 2-ethyl-hexoate stabilizer, with ½ part of triphenyl phosphite as the anti-clouding agent for the stabilizer. 5 parts of titanium dioxide is added as filler. Color is also added. The whole mass is then tumbled for a period of about 1 hour and is then transferred to a Banbury mixer whose temperature is at approximately 300° F., for fusion. The mass is then dropped and transferred to a warmup mill. Strips are taken off and fed into the hopper of an extruder and the compound is extruded in the form of a solid round rod whose diameter is approximately ⅜ inch. The rod of compound is cooled and sliced to form small pellets. These pellets are then used for the extrusion of vinyl strips or sheets or to cover copper wire for insulation purposes.

Example 4

The procedure of Examples 1, 2 or 3 is followed with the exception that any one of the stabilizing agents referred to above is substituted on a pound for pound basis for the metal salts used as stabilizers in the above examples and tributyl acetyl citrate is used as the plasticizer for the vinyl resin.

Example 5

The procedure of Examples 1–4 is followed with the exception that any one of the anti-clouding agents given previously herein is substituted on a pound for pound basis for the phosphite in the above examples.

Example 6

The procedure of Examples 1–5 is followed with the exception that any one of the vinyl resins given previously herein is substituted on a pound for pound basis for the vinyl chloride resins in the above examples.

Products made as described are satisfactorily stable when exposed to heat or light under usual conditions of storage or use.

It will be understood that it is intended to cover all changes and modifications of the examples of the invention herein chosen for the purpose of illustration which do not constitute departures from the spirit and scope of the invention.

What we claim is:

1. A resinous composition comprising a vinyl halide resin, a metal salt stabilizer dispersed in the resin, and an anti-clouding agent retarding precipitation of metal from the stabilizer on warming the composition, the anti-clouding agent being a compound selected from the group consisting of alkyl and aryl phosphites and sulfides and dialkyl and diaryl derivatives of phenol, cresol and xylenol and the anti-clouding agent being soluble in the vinyl halide resin and substantially non-volatile.

2. A resinous composition comprising a vinyl chloride resin, a metal salt stabilizer dispersed in the resin, and an agent retarding precipitation of metal from the stabilizer on warming the composition, the said agent being a compound selected from the group consisting of alkyl and aryl phosphites and sulfides and dialkyl and diaryl derivatives of phenol, cresol and xylenol and the said agent being soluble in the vinyl chloride resin and substantially non-volatile.

3. A resinous composition comprising a vinyl chloride resin, a metal salt stabilizer dispersed in the resin, and an organic phosphite dissolved in the said resin.

4. A resinous composition comprising a vinyl chloride resin, a metal salt stabilizer dispersed in the resin, and an organic phosphite dissolved in the said resin, the proportion of the phosphite being 0.05 to 0.5 part for 100 parts of the resin.

5. A resinous composition comprising a vinyl chloride resin, a metal salt stabilizer dispersed in the resin, and an alkyl phosphite dissolved in the said resin.

6. A resinous composition comprising a vinyl chloride resin, a metal salt stabilizer dispersed in the resin, and an aryl phosphite dissolved in the said resin.

7. A resinous composition comprising a vinyl chloride resin, a metal salt stabilizer dispersed in the resin, and an alkyl sulfide dissolved in the said resin, the alkyl sulfide being soluble in the vinyl halide resin and substantially non-volatile.

8. A resinous composition comprising a vinyl chloride resin, a metal salt stabilizer dispersed in the resin, and a disubstituted phenol dissolved in the said resin, the di-substituted phenol being a dialkyl phenol.

WILLIAM E. LEISTNER.
ARTHUR C. HECKER.
OLGA H. KNOEPKE.

REFERENCES CITED

The following references are of record in the file of this patent:

UNITED STATES PATENTS

| Number | Name | Date |
|---|---|---|
| 2,456,216 | Richter | Dec. 14, 1948 |